United States Patent
Swarts et al.

(10) Patent No.: US 8,189,541 B2
(45) Date of Patent: May 29, 2012

(54) METHOD AND SYSTEM FOR GENERATING TIMED EVENTS IN A RADIO FRAME IN AN E-UTRA/LTE UE RECEIVER

(75) Inventors: Francis Swarts, San Diego, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 504 days.

(21) Appl. No.: 12/502,196

(22) Filed: Jul. 13, 2009

(65) Prior Publication Data
US 2011/0007718 A1    Jan. 13, 2011

(51) Int. Cl.
*H04J 3/06*    (2006.01)

(52) U.S. Cl. ........ 370/336; 370/330; 370/350; 375/149; 375/343; 375/260; 375/326; 375/329

(58) Field of Classification Search ............ 370/336, 370/330, 350; 375/260, 326, 329, 324, 149, 375/343

See application file for complete search history.

(56) References Cited

U.S. PATENT DOCUMENTS

| | | | |
|---|---|---|---|
| 6,314,129 B1 * | 11/2001 | Sunwoo et al. | 375/149 |
| 6,567,482 B1 * | 5/2003 | Popovic' | 375/343 |
| 6,862,324 B1 * | 3/2005 | Lui et al. | 375/326 |
| 7,110,441 B2 * | 9/2006 | Kawai | 375/149 |
| 2002/0075833 A1 * | 6/2002 | Dick et al. | 370/336 |
| 2006/0222108 A1 * | 10/2006 | Cousineau | 375/324 |
| 2009/0046671 A1 * | 2/2009 | Luo | 370/336 |
| 2010/0182979 A1 * | 7/2010 | Malladi et al. | 370/336 |

* cited by examiner

*Primary Examiner* — Ricky Ngo
*Assistant Examiner* — Rasheed Gidado
(74) *Attorney, Agent, or Firm* — Sterne, Kessler, Goldstein & Fox PLLC

(57) ABSTRACT

A mobile device coupled to a common system clock receives a signal comprising a primary synchronization sequence (PSS) and a secondary synchronization sequence (SSS) in a radio frame. Sample counts are generated for timed events based on corresponding operating bandwidths. The timed events are detected at modulo sample counts of the generated sample counts according to corresponding operating bandwidths. PSS symbol timing determined via the PSS synchronization is aligned to the generated sample counts based on corresponding operating bandwidth. The generated sample counts are bit-shifted relative to the aligned PSS symbol timing for other timed events based on corresponding operating bandwidths. The one or more timed events are determined via performing modulo counting after the bit-shifting. Timing operations are performed at the determined timed events and the determined one or more timed events are refined, accordingly.

20 Claims, 6 Drawing Sheets

METHOD AND SYSTEM FOR GENERATING TIMED EVENTS IN A RADIO FRAME IN AN E-UTRA/LTE UE RECEIVER

CROSS-REFERENCE TO RELATED APPLICATIONS/INCORPORATION BY REFERENCE

This application makes reference to U.S. application Ser. No. 12/500,575, which is filed on Jul. 9, 2009.

The above stated application is hereby incorporated herein by reference in its entirety.

FIELD OF THE INVENTION

Certain embodiments of the invention relate to communication systems. More specifically, certain embodiments of the invention relate to a method and system for generating timed events in a radio frame in an E-UTRA/LTE UE receiver.

BACKGROUND OF THE INVENTION

Various communication standards such as Evolved Universal Terrestrial Radio Access (EUTRA), also called Long Term Evolution (LTE), have been developed to offer comparatively high data rates to support high quality services. LTE/E-UTRA is a Third Generation Partnership Project (3GPP) standard that provides for an uplink speed of up to 50 megabits per second (Mbps) and a downlink speed of up to 100 Mbps. The LTE/E-UTRA standard represents a major advance in cellular technology. The LTE/E-UTRA standard is designed to meet current and future carrier needs for high-speed data and media transport as well as high-capacity voice support. The LTE/E-UTRA standard brings many technical benefits to cellular networks, some of which include the benefits provided by Orthogonal Frequency Division Multiplexing (OFDM) and/or Multiple Input Multiple Output (MIMO) data communication. In addition, Orthogonal Frequency Division Multiple Access (OFDMA) and Single Carrier-Frequency Division Multiple Access (SC-FDMA) are used on the downlink (DL) and on the uplink (UL), respectively.

Mobility management represents an important aspect of the LTE/E-UTRA standard. As a mobile device, also called user equipment (UE) in the LTE/E-UTRA standard, moves within an LTE/E-UTRA coverage area, the use of synchronization signal transmissions and cell search procedures provide a basis for the mobile device or UE to detect and synchronize with individual cells. To communicate with a particular cell, mobile devices in associated LTE/E-UTRA coverage area needs to determine one or more cell specific transmission parameters such as, for example, symbol timing, radio frame timing, and/or a cell ID. In the LTE/E-UTRA standard, the cell-specific information is carried by reference and/or synchronization signals. The latter forms the basis for downlink (DL) synchronization and cell specific information identification at the mobile devices within the associated LTE/E-UTRA coverage area. Two downlink (DL) synchronization signals, namely Primary Synchronization Signal (PSS) and Secondary Synchronization Signal (SSS), are used to allow the mobile devices to synchronize to transmission timing of the particular cell, and thereby obtain cell specific information such as antenna configuration indicator, full physical Cell ID, and/or a Cell ID group indicator.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for generating timed events in a radio frame in an LTE/E-UTRA UE receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for generating timed events in a radio frame in an E-UTRA/LTE UE receiver. A mobile device coupled to a common system clock is operable to perform timing operations such as PSS synchronization and SSS detection based on the common system clock. The mobile device is operable to receive a signal comprising a primary synchronization sequence or signal (PSS) and a secondary synchronization sequence or signal (SSS) in a radio frame from a base station. The received PSS and the received SSS may be used to acquire cell-specific parameters via the PSS synchronization and the SSS detection, respectively. The cell-specific parameters may comprise transmission timing associated with transmissions of the base station. The mobile device may be operable to generate sample and/or cycle counts of the common system clock for one or more timed events of the received signal in the radio frame based on corresponding operating bandwidths. The mobile device may be operable to detect the one or more timed events at modulo sample counts of the generated sample and/or cycle counts according to corresponding operating bandwidths. The one or more timed events in the radio frame may comprise PSS symbol timing, SSS symbol timing, sub-frame timing, half-frame timing and/or frame timing of the radio frame. The mobile device may be operable to synchronize to the received PSS in order to determine the PSS symbol timing. Once the PSS synchronization is established, the mobile device may be operable to count samples of the common system clock relative to the determined PSS symbol timing. The mobile device may be operable to align the determined PSS symbol timing to the counted samples based on a corresponding sampling rate, for example, 0.96 MHz.

The counted samples may be bit-shifted to generate sample counts for the one or more timed events in the radio frame. The sample counts may be generated based on corresponding operating bandwidths. The generated sample counts may be modulo counted to determine the one or more timed events according to the corresponding operating bandwidths. Timing operations may be performed at the determined timed events. Timed event information derived from the corresponding timing operations, for example, the identified SSS timing via the SSS detection, may be utilized to refine the detected one or more timed events.

Figure 1:
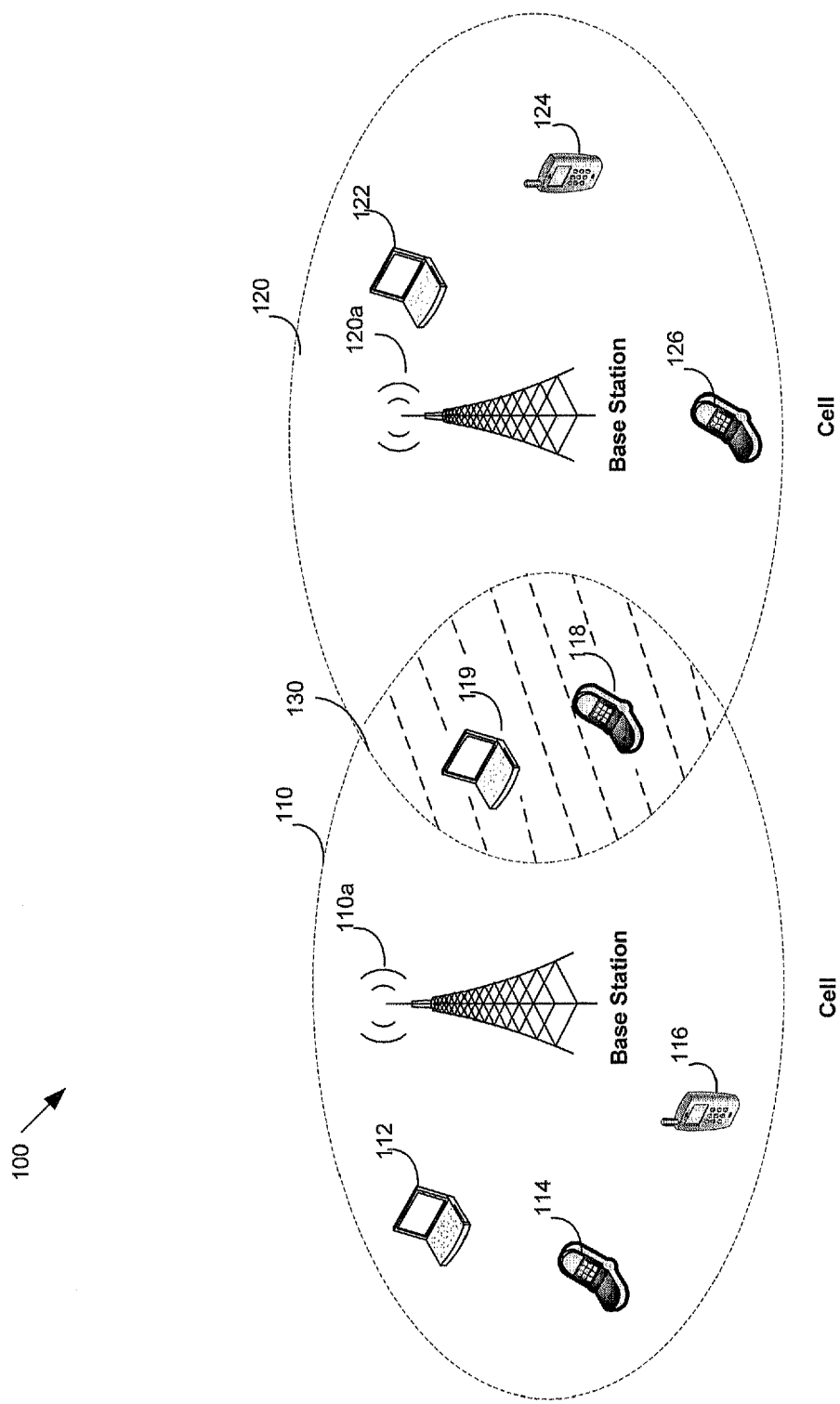
FIG. 1 is a diagram illustrating an exemplary LTE/E-UTRA communication system that is operable to generate timed events in a radio frame based on system clock aligned PSS hypothesis timings in a LTE/EUTRA UE receiver, in accordance with an embodiment of the invention.

FIG. 1 is a diagram illustrating an exemplary LTE/E-UTRA communication system that is operable to generate timed events in a radio frame based on system clock aligned PSS hypothesis timings in a LTE/E-UTRA UE receiver, in accordance with an embodiment of the invention. Referring to FIG. 1, there is shown a LTE/E-UTRA communication system 100. The LTE/E-UTRA communication system 100 comprises a plurality of cells, of which cells 110-120 are displayed. A LTE/E-UTRA coverage area 130 is the overlapped coverage area of the cell 110 and the cell 120. The cell 110 and the cell 120 are associated with a base station 110a and a base station 120a, respectively. The LTE/E-UTRA communication system 100 comprises a plurality of mobile devices, of which mobile devices 110-126 are illustrated. The mobile devices 112-116 are shown located in the cell 110. The mobile devices 122-126 are shown located in the cell 120. The mobile device 118 and the mobile device 119 are shown located in the overlapped LTE/E-UTRA coverage area 130.

A base station such as the base station 110a may comprise suitable logic, circuitry, interfaces and/or code that are operable to manage various aspects of communication, for example, communication connection establishment, connection maintenance and/or connection termination, with associated mobile devices within the cell 110. The base station 110a may be operable to manage associated radio resources such as, for example, radio bearer control, radio admission control, connection mobility control, and/or dynamic allocation of radio resources within the cell 110 in both uplink and downlink communication. The base station 110a may be operable to utilize physical channels and physical signals for communications in both the uplink and the downlink communication. The physical channels may carry information from higher layers to communicate user data as well as user control information. The physical signals such as synchronization signals may not carry information from higher layers. In the LTE/E-UTRA standard, the base station 110a may be operable to transmit a primary synchronization signal (PSS) and a secondary synchronization signal (SSS).

The base station 110a may be operable to transmit the PSS and the SSS on a per 5 ms basis, in the last two OFDM symbols of the first and eleventh slot in each radio frame. The PSS is chosen from a variety of Zadhoff-Chu sequences, carrying the information of the identity of the base station or cell within a cell group. The SSS is a sequence carrying the information about the cell group, encoded with a scrambling sequence, which is unique to an associated mobile device. The scrambling code may be linked or mapped to, for example, the index of the PSS. After successful time and frequency synchronization via the PSS synchronization, the frame boundary synchronization and/or the cell identification may be performed via SSS detection. The transmission of the PSS and the SSS may allow timing and frequency offset issues to be resolved before cell-specific information may be determined. This may reduce complexity in initial cell search and/or handover modes for associated mobile devices such as the mobile device 114 and the mobile device 118.

A mobile device such as the mobile device 118 may comprise suitable logic, circuitry, interfaces and/or code that may be operable to communicate with a base station such as the base station 110a for services supported, for example, in the LTE/E-UTRA standard. To communicate with the base station 110a, the mobile device 118 may be operable to determine one or more transmission parameters used by base station 110a. Such information may be obtained by, for example, decoding a Broadcast Channel (BCH) signal from the base station 110a. To that end, the mobile device 118 may need to synchronize to corresponding symbol timing and frame timing of transmissions from the base station 110a so as to acquire cell-specific parameters such as, for example, associated cell ID and/or antenna configuration. In this regard, the mobile device 118 may be operable to receive a plurality of PSSs and SSSs every 5 ms from neighbor or surrounding base stations such as the base station 110a and the base station 120a. The received plurality of PSSs are base station or cell specific.

The mobile device 118 may be operable to detect or select a particular PSS from the received plurality of PSSs to acquire PSS synchronization. The selected PSS may be used to estimate a channel. The resulting channel estimates may be utilized to decode or detect the associated SSS for frame boundary synchronization and cell group information identification. Various methods may be used by the mobile device 118 to detect or select the particular PSS out of the received plurality of PSSs. For example, the mobile device 118 may be operable to generate a plurality of correlation reference sequences (reference PSSs) each to correlate or match with the received plurality of PSSs, respectively. Resulting correlation peaks may indicate possible PSS symbol timing hypotheses under consideration. The mobile device 118 may be operable to compare the resulting correlation peaks to select the particular PSS corresponding to the maximum correlation peak. The position of the maximum peak magnitude may indicate the starting position of the particular PSS and provide the symbol timing for the particular PSS of the corresponding cell such as the cell 110. The PSS symbol timing may be utilized to detect the received SSSs for cell specific information such as, for example, frame boundary and/or Cell ID group indicator.

Timing operations may be performed by the mobile device 118 based on an associated common system clock, for example, a 30.72 MHz clock. In this regard, once the mobile device 118 synchronizes to the received PSS, the mobile device 118 may be operable to align the resulting PSS symbol timing to the associated common system clock based on corresponding operating bandwidth. In this regard, the mobile device 118 may be operable to count samples and/or cycles of the common system clock in a PSS transmission interval. The PSS interval may indicate a time interval, for example, 5 ms, between two successive PSS symbol occurrences in a radio frame. A total of 153600 samples and/or cycles of the common system clock sampling at 30.72 MHz may be counted within the PSS transmission interval of 5 ms. The 153600 samples may be divided into sample counts for timing operations based on corresponding operating bandwidths. For example, in instances where the PSS synchronization may be performed at a sampling frequency of 0.96 MHz, the 153600 samples may be shifted by 5 bits to the right, i.e. divided by 32, to form sample counts for the PSS symbol timing, modulo 4800.

The PSS symbol timing may be detected by determining the maximum PSS correlation magnitude relative to the corresponding modulo 4800 counter. For the aligned PSS symbol timing, the mobile device 118 may be operable to utilize the 153600 samples to determine other timed events. Exemplary timed events may comprise the SSS symbol timing, sub-frame timing and/or half-frame timing based on corresponding operating bandwidths. In instances where the SSS detection may be performed at a sampling rate of 1.92 MHz, the 153600 samples may be shifted, for example, by 4 bits, to form sample counts for the SSS symbol timing. The SSS symbol timing, implied by PSS timing, may be determined by counting the samples decimated to a sampling rate of 1.92 MHz, relative to the modulo 9600 counter.

In an exemplary operation, the base station 110*a* may be operable to perform communications within the cell 110 using physical channels and physical signals such as a PSS and a SSS. The base station 110*a* may be operable to transmit base station specific PSS and SSS, regularly, for example, every 5 ms. To communicate with the base station 110*a*, a mobile device such as the mobile device 118 may be operable to acquire the transmitted PSS and SSS so as to determine one or more transmission parameters used by base station 110*a*. For example, the mobile device 118 may be operable to acquire PSS synchronization to identify the symbol timing and estimate a channel. The resulting channel estimates and the identified symbol timing may be used to detect the transmitted SSS for cell specific parameters such as frame boundary synchronization and/or cell group information.

Timing operations such as the PSS synchronization and/or the SSS detection may be performed by the mobile device 118 using the associated common system clock of, for example, 30.72 MHz. Once the PSS synchronization may be established, the resulting PSS symbol timing may be determined or aligned with the associated common system clock. In this regard, the mobile device 118 may be operable to count samples and/or cycles of the associated system clock in a PSS transmission interval. The counted samples in the PSS transmission interval may be bit-shifted based on a corresponding sampling rate, for example, 0.96 MHz, to form sample counts for the PSS symbol timing. The resulting PSS symbol timing may be detected by counting the corresponding decimated samples modulo 4800, for example. Subsequently, the mobile device 118 may be operable to utilize the counted samples in the PSS transmission interval to determine other timed events. Exemplary timed events may comprise SSS symbol timing, individual OFDM symbol timing, sub-frame timing and/or half-frame timing based on corresponding operating bandwidths. For example, in instances where the SSS detection may be performed at 1.92 MHz, the sample counts may be shifted, for example, by 4 bits, to form sample counts for the SSS symbol timing. The SSS symbol timing, implied by PSS timing, may be determined by counting the corresponding decimated samples modulo 9600.

Figure 2:
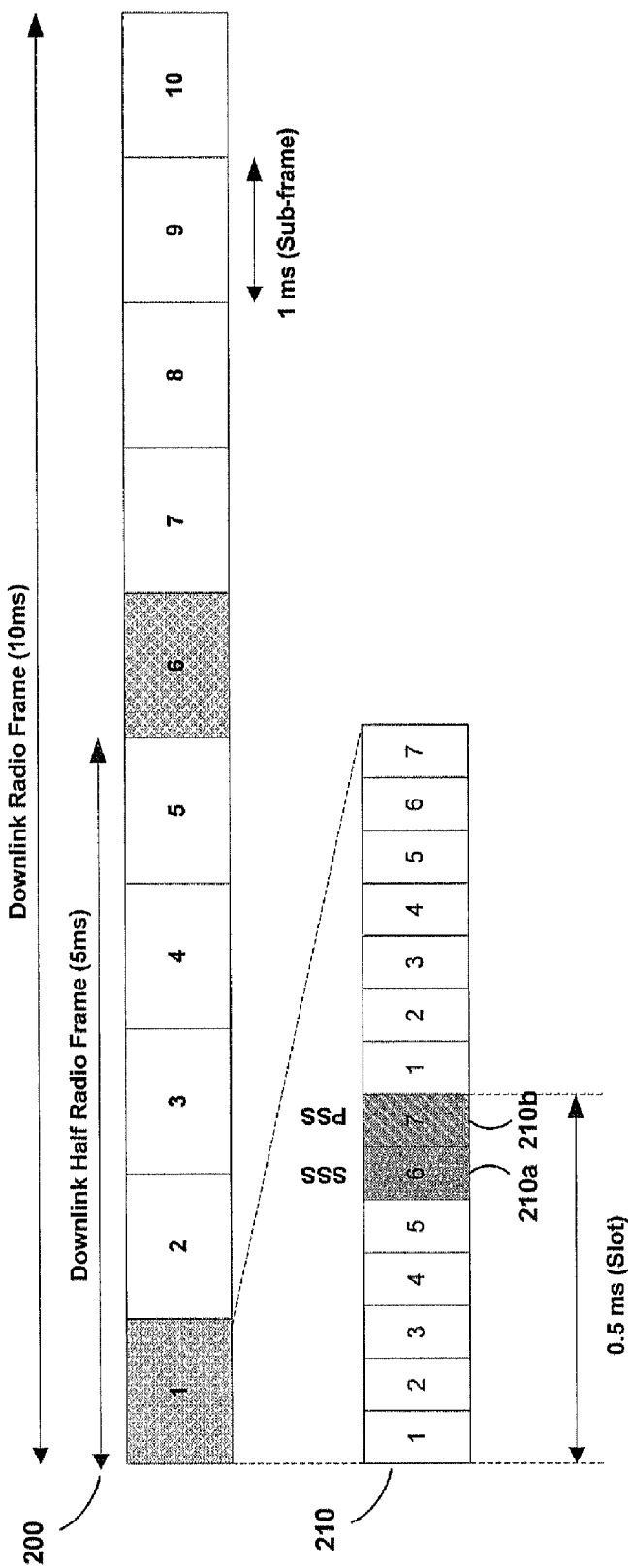
FIG. 2 is a block diagram of an exemplary LTE/E-UTRA downlink synchronization signal structure, which is utilized in accordance with an embodiment of the invention.

FIG. 2 is a block diagram of an exemplary E-UTRA/LTE downlink synchronization signal structure, which is utilized in accordance with an embodiment of the invention. Referring to FIG. 2, there is shown a downlink radio frame 200. In the LTE/E-UTRA standard, the downlink radio frame 200 may be divided into twenty equally sized slots with two contiguous slots arranged into a sub-frame such as the sub-frame 210. Downlink synchronization signals such as a PSS 210*a* and a SSS 210*b* may be transmitted from a base station such as, for example, the base station 110*a* and/or the base station 110*b*, to associated mobile devices such as the mobile device 118 so that the mobile device 118 may obtain correct timing for the downlink radio frame 200 and acquire cell-specific parameters such as, for example, associated cell ID and/or antenna configuration.

The PSS 210*a* and the SSS 210*b* may be transmitted on sub-frame 0 and 5 of the downlink radio frame 200 and occupy two consecutive symbols in a corresponding sub-frame. The PSS may be used to identify the symbol timing and the cell ID within a cell ID group. The SSS may be used for identifying frame boundary, detecting cell ID group, and/or acquiring system parameters such as cyclic prefix (CP) length. Signals in the downlink radio frame 200 may comprise various timed events such as, for example, symbol timing, slot timing, sub-frame timing, and/or half-frame timing. In this regard, once the PSS synchronization is established, resulting PSS symbol timing for the PSS 210*b* may be aligned to an associated common system clock according to corresponding operating bandwidth. In instances where the PSS synchronization may be performed at a sampling rate of 0.96 MHz, samples and/or cycles of the associated common system clock, for example, a 30.72 MHz clock, may be counted in a PSS transmission interval such as 5 ms. The resulting counted samples may be shifted by 5 bits, for example, to form sample counts for the resulting PSS symbol timing. The resulting PSS symbol timing may be aligned with the associated common system clock by counting the corresponding sample counts modulo 4800, for example.

After a successful PSS symbol timing alignment, other timed events such as SSS symbol timing, sub-frame timing, and/or half-frame timing, in a radio frame, may be determined using the counted samples in the PSS transmission interval. In this regard, the counted samples in the PSS transmission interval may be divided according to corresponding operating bandwidths of timed events. For example, in instances where the SSS detection for the SSS 210*a* may be performed at 1.92 MHz, the counted samples in the PSS transmission interval may be shifted, for example, by 4 bits, to form sample counts for the SSS symbol timing. The SSS symbol timing may be determined by counting the corresponding decimated samples modulo 9600, for example.

Figure 3:
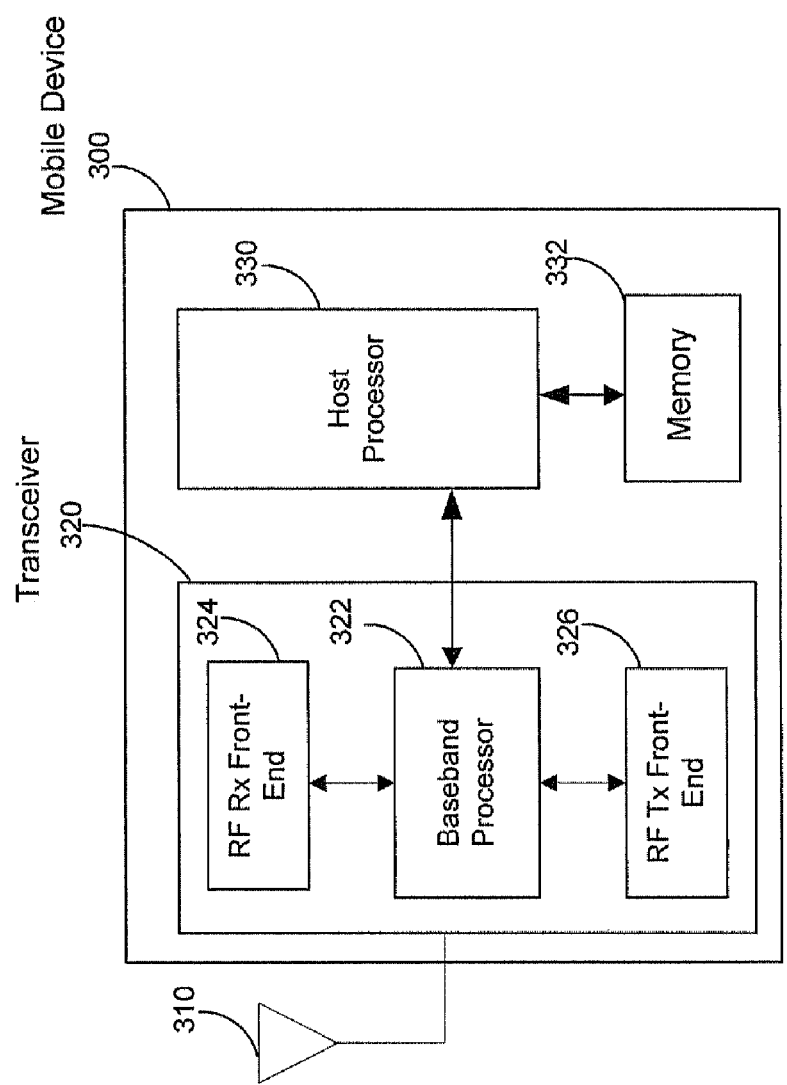
FIG. 3 is a block diagram of an exemplary mobile device that may be operable to generate timed events in a radio frame based on system clock aligned PSS hypothesis timings in an LTE/E-UTRA UE receiver, in accordance with an embodiment of the invention.

FIG. 3 is a block diagram of exemplary mobile device that may be operable to generate timed events in a radio frame based on system clock aligned PSS hypothesis timings in an E-UTRA/LTE UE receiver, in accordance with an embodiment of the invention. Referring to FIG. 3, there is shown a mobile device 300 comprising an antenna 310, a transceiver 320, a host processor 330 and a memory 332. The transceiver 320 comprises a radio frequency (RF) receiver (Rx) front-end 324, a radio frequency (RF) transmitter (Tx) front-end 326 and a baseband processor 322.

The antenna 310 may comprise suitable logic, circuitry, interfaces and/or code that may be suitable for transmitting and/or receiving electromagnetic signals. Although a single antenna is illustrated, the invention is not so limited. In this regard, the transceiver 320 may be operable to utilize a common antenna for transmission and reception of radio frequency (RF) signals adhering to one or more wireless standards, may utilize different antennas for each supported wireless standard, and/or may utilize a plurality of antennas for each supported wireless standard. Various multi-antenna configurations may be utilized to take advantage of smart antenna technologies, diversity and/or beamforming, for example.

The transceiver 320 may comprise suitable logic, circuitry, interfaces and/or code that may be operable to transmit and/or receive RF signals adhering to one or more wireless standards such as the LTE/E-UTRA standard.

The RF Rx front-end 324 may comprise suitable logic, circuitry, interfaces and/or code that may be operable to process RF signals received, for example, over a LTE/E-UTRA air interface, via the antenna 310. The RF Rx front-end 324 may be operable to convert the received RF signals to corresponding baseband signals. The resulting baseband signals may be communicated with the baseband processor 322 for further baseband processing.

The RF Tx front-end 326 may comprise suitable logic, circuitry, interfaces and/or code that may be operable to process RF signals for transmission. The RF Tx front-end 326 may be operable to receive baseband signals from the baseband processor 128 and convert the baseband signals to corresponding RF signals for transmission via the antenna 310.

The baseband processor 322 may comprise suitable logic, circuitry, interfaces and/or code that may be operable to manage and/or control operations of the RF Rx front-end 324 and the RF Tx front-end 326, respectively. The baseband processor 322 may be operable to communicate baseband signals with the transceiver 320. The baseband processor 322 may be operable to handle baseband signals to be transferred to the RF Tx front-end 326 for transmission and/or process baseband signals from the RF Rx front-end 224. The received baseband signals may comprise synchronization signals such as a PSS and a SSS. The received PSS and SSS may be utilized to acquire transmission timing and other cell-specific parameters such as, for example, associated cell ID and/or antenna configuration used in an associated cell. In this regard, the baseband processor 322 may be operable to generate a plurality of correlation reference sequences (reference PSSs) for acquiring PSS synchronization. After a successful PSS synchronization, the baseband processor 322 may be operable to perform the SSS detection so as to acquire cell-specific parameters such as, for example, cell ID group and system parameters such as cyclic prefix (CP) length. The acquired cell-specific parameters may ensure that the mobile device 300 communicates properly with an associated base station such as the base station 110a.

The baseband processor 322 may be operable to perform various timing operations such as the PSS synchronization and/or the SSS detection using an associated common system clock of, for example, 30.72 MHz. Once the PSS synchronization is established, the resulting PSS symbol timing may be aligned with the associated common system clock according to a corresponding operating bandwidth. In this regard, the baseband processor 322 may be operable to count samples and/or cycles of the associated system clock in a PSS transmission interval. The counted samples in the PSS transmission interval may be divided based on corresponding operating bandwidth to form sample counts for the PSS symbol timing. For example, for the PSS synchronization at a sampling rate of 0.96 MHz, the counted samples in the PSS transmission interval may be shifted by 5 bits to form sample counts for the PSS symbol timing. The PSS symbol timing may be detected by counting the corresponding decimated samples modulo 4800, for example. Subsequently, the mobile device 118 may be operable to utilize the counted samples in the PSS transmission interval to determine other timed events such as, for example, the SSS symbol timing, sub-frame timing and/or half-frame timing in a radio frame according to corresponding operating bandwidths. For example, in instances where the SSS detection may be performed at 1.92 MHz as required in the LTE/E-UTRA standard, a decimated sample count in the PSS transmission interval may be shifted, for example, by 4 bits, to form sample counts for the SSS symbol timing. The SSS symbol timing may be detected by counting the corresponding decimated samples modulo 9600.

The host processor 330 may comprise suitable logic, circuitry, interfaces and/or code that may be operable to manipulate and control operation of the transceiver 320. The host processor 130 may be operable to communicate data with the transceiver 320 to support applications such as, for example, audio streaming on the mobile device 300.

The memory 332 may comprise suitable logic, circuitry, and/or code that may enable storage of information such as executable instructions and data that may be utilized by the host processor 330 as well as the baseband processor 322. The executable instructions may comprise algorithms that may be applied to various baseband signal processes such as synchronization and/or channel estimation. The memory 332 may comprise RAM, ROM, low latency nonvolatile memory such as flash memory and/or other suitable electronic data storage.

In an exemplary operation, the RF Rx front-end 124 may be operable to process RF signals received via the antenna 310 over the LTE/E-UTRA air interface, for example. The received RF signals may comprise PSSs and SSSs transmitted by base stations such as the base station 110a and/or the base station 120a. The received RF signals may be converted to corresponding baseband signals and communicated with the baseband processor 322 for further baseband processing. To communicate with a particular base station such as the base station 110a, the baseband processor 322 may be operable to synchronize to cell specific transmission timing such as, for example, the symbol timing and frame boundary used by the base station 110a. In this regard, the baseband processor 322 may be operable to generate a plurality of correlation reference sequences (reference PSSs) for acquiring PSS synchronization.

The baseband processor 322 may be operable to perform a correlation process between the received baseband signals and each of the plurality of generated correlation reference sequences (reference PSSs). The received PSS may be detected according to the resulting correlation peaks. The position of the maximum correlation peak may be used to detect the received PSS and identify the corresponding symbol timing of the received baseband signals. Once the PSS synchronization is established, the resulting PSS symbol timing may be aligned with the associated common system clock of 30.72 MHz, for example. Subsequently, the baseband processor 322 may be operable to determine other timed events such as the SSS symbol timing and/or sub-frame timing, within the radio frame, by aligning with the associated common system clock relative to the aligned PSS symbol timing. In this regard, samples of the associated system clock in a PSS transmission interval may be counted. The counted samples in the PSS transmission interval may be divided to sample counts for various timing operations such as the PSS synchronization and/or the SSS detection based on corresponding operating bandwidths. For example, in instances where the PSS synchronization may be performed at a sampling rate of 0.96 MHz, the counted samples in the PSS transmission interval may be shifted, by 5 bits, for example, to form sample counts for the PSS symbol timing. The PSS symbol timing may be aligned to the associated system clock by counting the corresponding decimated samples modulo 4800.

Figure 4:
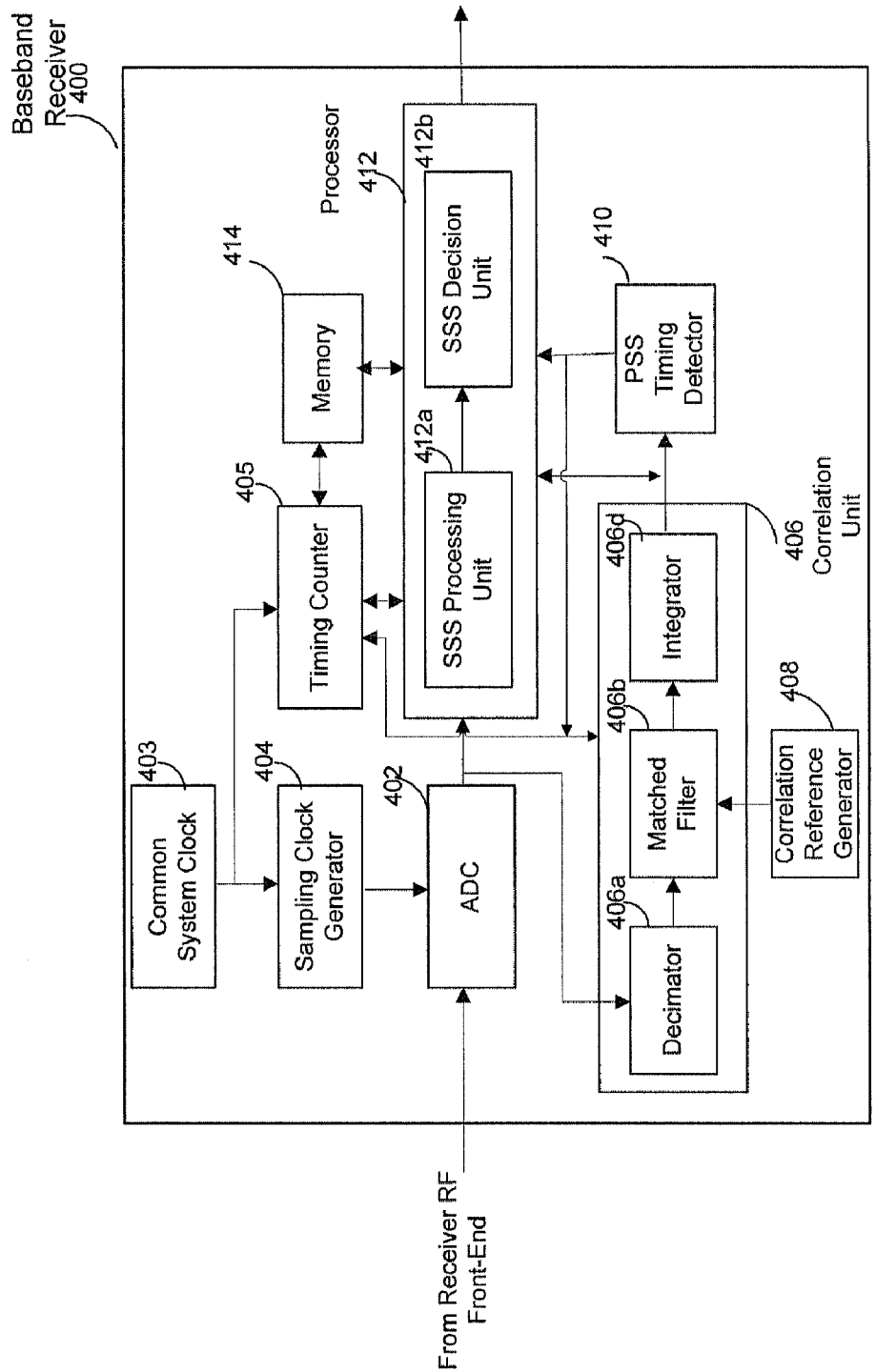
FIG. 4 is a block diagram illustrating an exemplary baseband receiver that is operable to generate timed events in a radio frame based on system clock aligned PSS hypothesis timings in an LTE/E-UTRA UE receiver, in accordance with an embodiment of the invention.

FIG. 4 is a block diagram illustrating an exemplary baseband receiver that is operable to generate timed events in a radio frame based on system clock aligned PSS hypothesis timings in an E-UTRA/LTE UE receiver, in accordance with an embodiment of the invention. Referring to FIG. 4, there is shown a baseband receiver 400. The baseband receiver 400 comprises an analog-to-digital converter (ADC) 402, a common system clock 403, a sampling clock generator 404, a timing counter 405, a correlation unit 406, a correlation reference generator 408, a PSS timing detector 410, a processor 412 and a memory 414. The correlation unit 406 comprises a decimator 406a, a matched filter 406b, and an integrator 406c. The processor 412 comprises a SSS processing unit 412a and a SSS decision unit 412b.

The ADC 402 may comprise suitable logic, circuitry, interfaces and/or code that may be operable to convert analog baseband signals received from the RF Rx front-end 324 to corresponding digital baseband signals (e.g., bytes). The ADC 402 may be operable to sample the received analog baseband signals at an analog-to-digital sampling rate of, for example, 1.92 MHz, which is provided by the sampling cock generator 404. The resulting digital baseband signals may comprise values that are representative of the analog baseband signal amplitudes. The digital baseband signals may be communicated with the processor 412 for further baseband processing.

The common system clock 403 may comprise suitable logic, circuitry, interfaces and/or code that may be operable to generate and provide a common system clock, for example, a 30.72 MHz clock, for timing operations of the baseband receiver 400.

The sampling clock generator 404 may comprise suitable logic, circuitry, interfaces and/or code that may be operable to generate a sampling clock and provide to the ADC 402 for analog-to-digital conversion. The sampling clock generator 404 may be operable to derive the sampling clock from the common system clock 403, for example, a 30.72 MHz clock, for the ADC 402.

The timing counter 405 may comprise suitable logic, circuitry, interfaces and/or code that may be operable to generate timed events in a radio frame based on an associated common system clock. The timed events may comprise symbol timing, sub-frame timing and/or half-frame timing in a radio frame. For a common system clock of 30.72 MHz, the timing counter 405 may be operable to generate 153600 samples in each PSS transmission interval of 5 ms. The timing counter 405 may be operable to align resulting PSS symbol timings to the common system clock of 30.72 MHz. In this regard, once the PSS synchronization is established, the timing counter 405 may be operable to count samples and/or cycles of the associated system clock within a PSS transmission interval. The sample count in the PSS transmission interval may be shifted based on corresponding operating bandwidth to form sample counts for the PSS symbol timing. For example, for the PSS synchronization at a sampling rate of 0.96 MHz, the corresponding sample counts for the PSS symbol timing may be formed by right shifting the counted samples in the PSS transmission interval by 5 bits. The PSS symbol timing may be detected by counting the decimated samples modulo 4800. Subsequently, the timing counter 405 may be operable to utilize the counted samples in the PSS transmission interval to determine other timed events such as, for example, OFDM symbol boundaries, the SSS symbol timing, sub-frame timing, half-frame timing and/or frame timing in a radio frame based on corresponding operating bandwidths. For example, in instances where the SSS detection may be performed at a sampling rate of 1.92 MHz, the sample count may be right shifted, for example, by 4 bits, to form decimated sample counts for the SSS symbol timing. The SSS symbol timing may be detected by counting the decimated samples modulo 9600.

The correlation unit 406 may comprise suitable logic, circuitry, interfaces and/or code that may be operable to perform a correlation process to acquire PSS synchronization. The correlation process may be performed at a sampling rate, which is different from the analog-to-digital sampling rate at the ADC 402. The correlation unit 406 may be operable to minimize the memory requirements for acquiring PSS synchronization by using a reduced sampling rate. The correlation unit 406 may be operable to achieve the reduced sampling rate via the decimator 406a.

The decimator 406a may comprise suitable logic, circuitry, interfaces and/or code that may be operable to downsample the digital baseband signals from the ADC 402 by a decimation factor of M, where $M \in \{2, 3, \ldots\}$. The decimation factor of M may be determined based on the PSS transmission rate and/or an ADC sampling rate used at the ADC 402. The decimator 406a may be operable to keep every Mth sample and discard the rest samples of the digital baseband signals. The downsampled or decimated digital baseband signals may be communicated with the matched filter 406b for acquiring PSS synchronization.

The matched filter 406b may comprise suitable logic, circuitry, interfaces and/or code that may be operable to correlate the downsampled or decimated digital baseband signals received from the decimator 406a with each of a plurality of correlation reference sequences provided by the correlation reference generator 408. The matched filter 406b may be operable to perform the correlation process for the PSS synchronization at a reduced sampling rate at the decimator 406a.

The integrator 406c may comprise suitable logic, circuitry, interfaces and/or code that may be operable to accumulate correlation values, which are calculated at the matched filter 406b, over one slot duration. Resulting correlation peaks may indicate possible PSS symbol timing hypotheses under consideration. In this regard, the number of the possible PSS symbol timing hypotheses may be minimized due to the usage of the reduced sampling rate at the matched filter 406b. Accordingly, the memory requirements for the integrator 406c may be reduced.

The correlation reference generator 408 may comprise suitable logic, circuitry, interfaces and/or code that may be operable to generate correlation reference sequences (reference PSSs) for the matched filter 406b of the correlation unit 406. The generated correlation reference sequences may be derived based on a variety of Zadoff-Chu sequences. The generated correlation reference sequences are complex-valued mathematical sequences in the time domain.

The PSS timing detector 410 may comprise suitable logic, circuitry, interfaces and/or code that may be operable to determine PSS transmission timing used in an associated cell according to peak correlation magnitude values at the output of the integrator 406c of the correlation unit 406. The PSS timing detector 410 may be operable to detect a particular PSS, which is transmitted by an associated base station, by using a peak-searching algorithm, for example. The peak-searching algorithm may be implemented to detect the particular PSS by comparing peak correlation magnitude values at the output of the integrator 406c of the correlation unit 406. The particular PSS may be detected according to the maximum peak correlation value. The position of the maximum peak magnitude may indicate the starting position of the detected particular PSS and provide transmission timing such as the (PSS) symbol timing used in the associated cell. The determined PSS position may be communicated with the processor 412 for SSS detection. The determined PSS position may also be communicated with the timing counter 405 to update the time event counting.

The symbol timing may be determined over one slot duration. However, in instances where the signal-to-noise ratio (SNR) is low or when fading is severe, the accuracy of the symbol timing determined based on observations over a single slot may be unreliable. To increase reliability, the symbol timing may be determined using observations over a plurality of slots and the results may then be combined, for example, using non-coherent combining. This may ensure that the correct symbol timing may be identified for transmissions in the associated cell.

The PSS detection may not be limited to the described peak-searching algorithm, but may be using an arbitrary correlation sequence detection algorithm. The resulting symbol timing obtained may also be used to establish initial frequency offset between a receiver local oscillator and a transmitter local oscillator.

The processor 412 may comprise suitable logic, circuitry, interfaces and/or code that may be operable to process digital baseband signals from the ADC 402. The processor 412 may be operable to process the digital baseband signals at, for example, 1.92 MHz as required in the LTE/E-UTRA standard. The processor 412 may be operable to perform various baseband procedures such as SSS detection using the detected particular PSS from the correlation unit 406 and the identified PSS symbol timing from the PSS timing detector 410. The processor 412 may be operable to process the digital baseband signals for the SSS detection only when the received SSSs may occur so as to save power of the baseband receiver 400. In this regard, the processor 412 may communicate with the timing counter 405 to update the SSS symbol timing determined by the timing counter 405. The processor 412 may be operable to process the digital baseband signals for the SSS detection according to the determined SSS symbol timing via the SSS processing unit 412a. The received SSS may be detected via the SSS decision unit 412b. The detected SSS may provide cell-specific parameters such as the cell ID and antenna configuration.

The SSS processing unit 412a may comprise suitable logic, circuitry, interfaces and/or code that may be operable to process the digital baseband signals received from the ADC 402 at, for example, 1.92 MHz, which is used at the ADC 402. The received digital baseband signals may be processed for coherent detection of the SSS according to the detected PSS from the correlation unit 406. For example, the SSS processing unit 412a may be operable to determine a mobile device specific scrambling code based on the detected PSS from the correlation unit 406. The SSS processing unit 412a may be operable to descramble the digital baseband signals using the determined scramble code and communicate the descrambled digital baseband signals with the SSS decision unit 412b for the SSS detection.

The SSS decision unit 412b may comprise suitable logic, circuitry, interfaces and/or code that may be operable to process the descrambled digital baseband signals from the SSS processing unit 412a for the SSS detection. The SSS decision unit 412b may be operable to determine the SSS position in the descrambled digital baseband signals based on the determined symbol timing from the cell timing unit 410. The determined SSS position may indicate, for example, frame boundary of transmissions in an associated cell. The determined SSS position may be communicated to the timing counter 405 to update the timed event counting. The SSS decision unit 412b may be operable to perform SSS decoding based on the determined SSS position for identifying cell-specific parameters such as, for example, cell ID group, reference signal sequences, and/or antenna configuration. The identified cell-specific parameters may ensure proper communications between the baseband receiver 400 with an associated base station such as, the base station 110a.

The memory 414 may comprise suitable logic, circuitry, and/or code that may enable storage of information such as executable instructions and data that may be utilized by the processor 412, the correlation unit 406, and/or the cell timing unit 410. The executable instructions may comprise algorithms that may be applied to various baseband procedures such as channel estimation, channel equalization, and/or channel coding. The executable instructions may comprise algorithms that may be applied to various correlation processes such as maximum ratio combining. The data may comprise sample counts and/or system clock aligned timed events such as SSS symbol timing and/or half-frame timing. The memory 414 may comprise RAM, ROM, low latency nonvolatile memory such as flash memory and/or other suitable electronic data storage.

In an exemplary operation, the baseband receiver 400 may be operable to receive analog baseband signals via the ADC 402. The received analog baseband signals may correspond to a RF signal transmitted by the base station 110a, for example. The received analog baseband signals may comprise a PSS and a SSS. The ADC 402 may be operable to convert the received analog baseband signals to corresponding digital baseband signals at a specific analog-to-digital sampling rate of, for example, 1.92 MHz. The specific analog-to-digital sampling rate may be provided by the sampling clock generator 404. The sampling clock generator 404 may be operable to generate the specific analog-to-digital sampling rate based on the common system clock 403, for example, a 30.72 MHz clock. The resulting digital baseband signals may be communicated with the correlation unit 406 for acquiring PSS synchronization.

The correlation unit 406 may be operable to communicate with the correlation reference generator 408 for correlation reference sequences (reference PSSs). The correlation reference generator 408 may be operable to generate or derive the correlation reference sequences based on a variety of Zadoff-Chu sequences. The generated correlation reference sequences are complex-valued sequences in the time domain. The correlation unit 406 may be operable to decimate the received digital baseband signals via the decimator 406a to reduce the sampling rate, for example, from 1.92 MHz to 0.96 MHz. The decimated digital baseband signals may be correlated via the matched filter 406b with each of the generated correlation reference sequences. Correlation values from the matched filter 406b may be accumulated over one slot duration via the integrator 406c. Resulting correlation peaks may provide possible PSS symbol timing hypotheses under consideration.

The correlation reference generator 408 may be operable to select or detect a particular PSS, which is transmitted by the base station 110a, according to the maximum peak correlation value at the output of the integrator 406c. The position of the maximum peak may indicate the starting position of the particular PSS and provide the PSS symbol timing used by the base station 110a. The PSS symbol timing information may be communicated to the processor 412 and the timing counter 405.

The timing counter 405 may be operable to align the PSS symbol timing to the common system clock 403, for example, a 30.72 MHz clock. The PSS symbol timing may be aligned relative to the common system clock 403 modulo 4800. The timing counter 405 may be operable to determine other timed events, for example, the SSS symbol timing, in a radio frame by aligning corresponding timed events to the common system clock 403 relative to the PSS symbol timing alignment. The determined SSS symbol timing may be communicated with the processor 412. The processor 412 may be operable to process the digital baseband signals at a sampling rate equal to the specific analog-to-digital sampling rate used by the ADC 402. The processor 412 may be operable to process the digital baseband signals for the SSS detection according to the detected PSS and the determined SSS symbol timing. For example, the processor 412 may be operable to perform SSS processing via the SSS processing unit 412*a* at the determined SSS symbol timing to detect the received SSS via the SSS decision unit 412*b* for cell-specific parameters such as the cell ID and antenna configuration.

Figure 5:
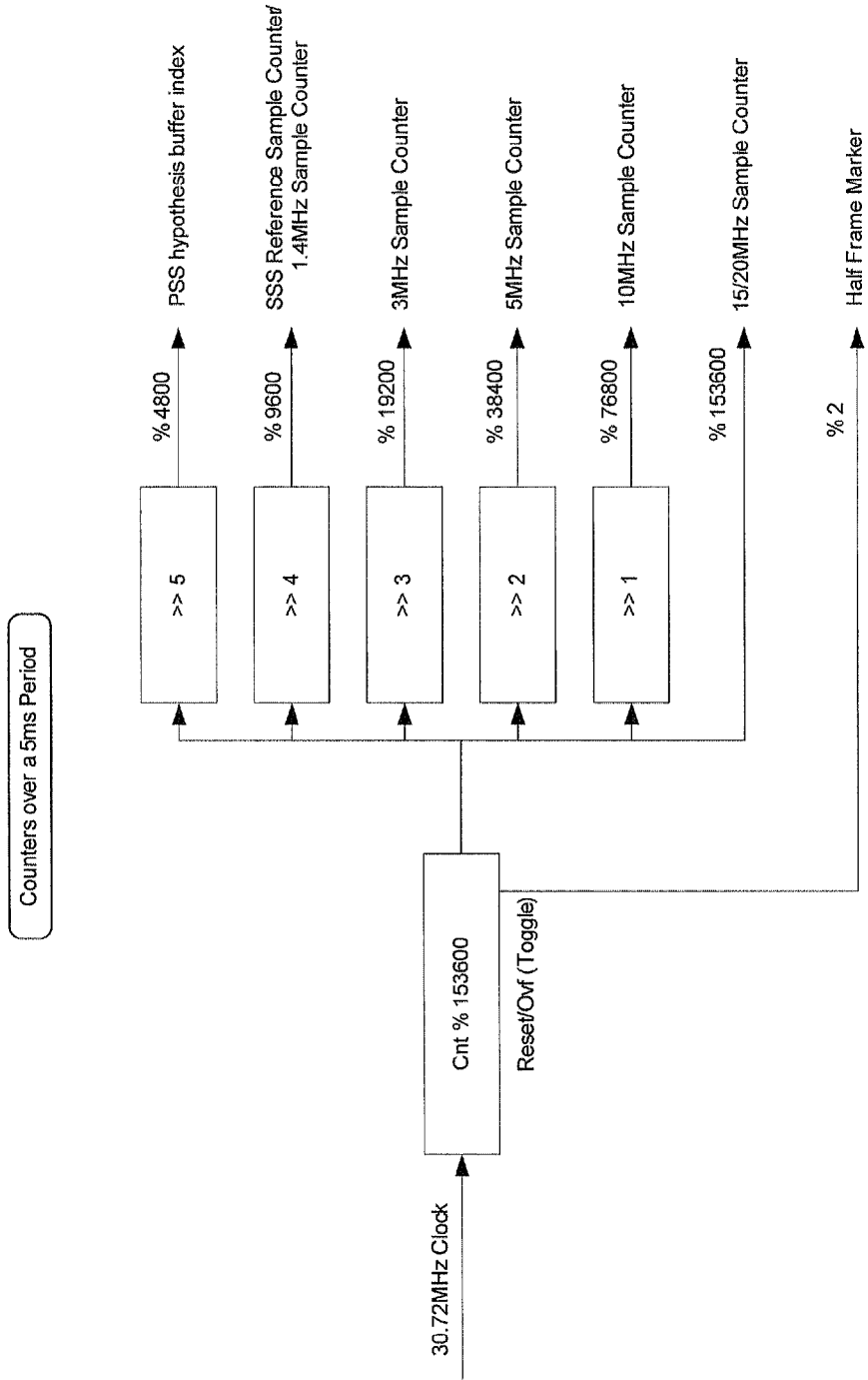
FIG. 5 is a block diagram illustrating an exemplary implementation for generating timed events in a radio frame based on system clock aligned PSS hypothesis timings in an LTE/E-UTRA UE receiver, in accordance with an embodiment of the invention.

FIG. 5 is a block diagram illustrating an exemplary implementation for generating timed events in a radio frame based on system clock aligned PSS hypothesis timings in an E-UTRA/LTE UE receiver, in accordance with an embodiment of the invention. Referring to FIG. 5, there is shown the common system clock 403, for example, a 30.72 MHz. The common system clock 403 may be operable to generate 153600 samples over a PSS transmission interval of 5 ms. The timing counter 405 may be operable to count samples and/or cycles of the common system clock 403 modulo 153600. The overflow or reset of the counted samples per PSS transmission interval modulo 2 may provide an indication of half-frame timing. In instances where the base station 110*a* is operating at a bandwidth of 15 or 20 MHz, the counted samples per PSS transmission interval may be used for the timing of transmission events, for example, the start of an OFDM symbol or sub-frame. Right bit-shifting the counted samples per PSS transmission interval by 1 bit and counting modulo 76800 may provide an indication of the start of transmission events such as, for example, OFDM symbols or sub-frames when the base station 110*a* may be configured for transmission at a bandwidth of 10 MHz. Right bit-shifting the counted samples per PSS transmission interval by 2 bits and counting modulo 38400 may provide an indication of the start of transmission events such as, for example, OFDM symbols or sub-frames when the base station may be configured for transmission at a bandwidth of 5 MHz. Right bit-shifting the counted samples per PSS transmission interval by 3 bits and counting modulo 19200 may provide an indication of the start of transmission events such as OFDM symbols or sub-frames when the base station 110 may be configured for transmission at a bandwidth of 3 MHz. Right bit-shifting the counted samples per PSS transmission interval by 4 bits and counting modulo 9600 may provide an indication of the start of transmission events such as OFDM symbols or sub-frames when the base station 110*a* may be configured for transmission at a bandwidth of 1.4 MHz, which may also be used as a SSS reference sample counter to assist in the SSS detection at a sampling rate of 1.92 MHz. Right bit-shifting the counted samples per PSS transmission interval by 5 bits and counting modulo 4800 may provide a sample counter for a PSS hypothesis buffer index of the PSS synchronization at a sampling rate of 0.96 MHz.

Figure 6:
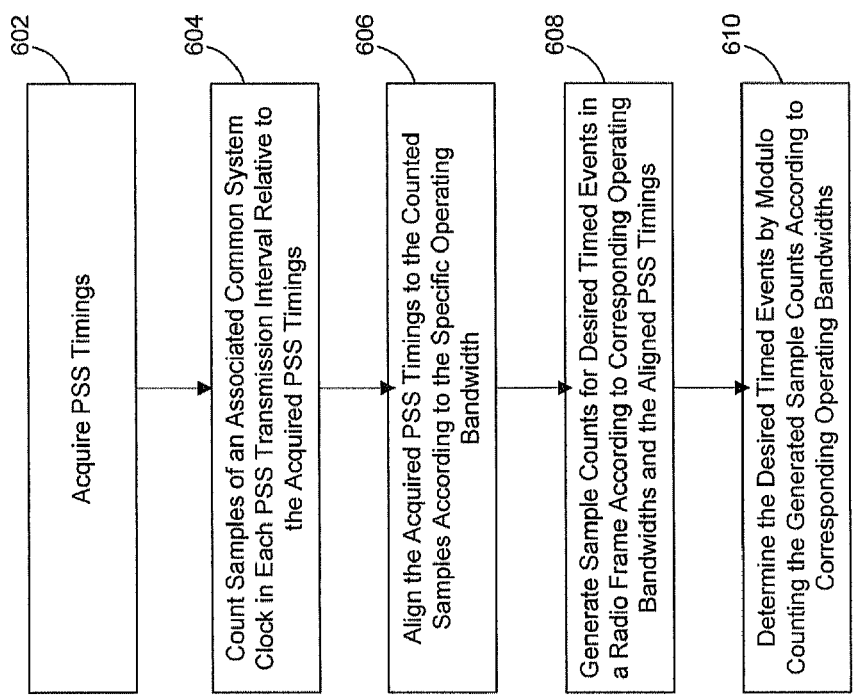
FIG. 6 is a flow chart illustrating an exemplary procedure that is utilized to generate timed events in a radio frame based on system clock aligned PSS hypothesis timings in an LTE/E-UTRA UE receiver, in accordance with an embodiment of the invention.

FIG. 6 is a flow chart illustrating an exemplary procedure that is utilized to generate timed events in a radio frame based on system clock aligned PSS hypothesis timings in an E-UTRA/LTE UE receiver, in accordance with an embodiment of the invention. The exemplary steps may start with the step 602. In step 602, the RF RX front-end 324 may be operable to receive RF signals over, for example, the LTE/E-UTRA air interfaces. The received RF signals may comprise synchronization signals such as a PSS and a SSS. The RF RX front-end 324 may be operable to convert the received RF signals to corresponding baseband signals and communicate with the baseband receiver 400. The baseband receiver 400 may be operable to acquire PSS symbol timing via the correlation unit 406 and the PSS timing detector 410 using a specific sampling rate such as 0.96 MHz. The acquired PSS symbol timing may be communicated to the processor 412 for the SSS detection and to the timing counter 405 for determining other timed events in a radio frame.

In step 604, the timing counter 405 may be operable to count samples of an associated common system clock within each PSS transmission interval. For example, 153600 samples may be counted in a PSS transmission interval of 5 ms for the common system clock of 30.72 MHz. In step 606, the timing counter 405 may be operable to align or mark the acquired PSS symbol timing to the counted samples. For example, for a sampling rate such as 0.96 MHz, the acquired PSS symbol timing may be aligned to the common system clock by right-shifting the sample counts by 5 bits and counting corresponding decimated samples modulo 4800. In step 608, the timing counter 405 may be operable to generate sample counts for desired timed events in a radio frame based on corresponding operating bandwidth and the position of the aligned PSS symbol timing. For example, as illustrated in FIG. 5, sample counts for the SSS detection at a sampling rate of 1.92 MHz may be generated by right-shifting the sample counts in the PSS transmission interval by 4 bits. In step 610, the timing counter 405 may be operable to determine or detect the desired timed events by modulo counting the generated sample counts based on corresponding operating bandwidths. For example, the SSS symbol timings may be detected by counting the corresponding sample counts modulo 9600 for the SSS detection at a sampling rate of 1.92 MHz. The number of bits by which the 5 ms interval sample counter (i.e. modulo 153600 counter), running at 30.72 MHz, may be right shifted and create the corresponding 5 ms interval counter associated with a particular operating bandwidth. The number of bits, which are right shifted, may be related to corresponding operating bandwidths.

In various exemplary aspects of the method and system for generating timed events in a radio frame in an E-UTRA/LTE UE receiver, a mobile device such as the mobile device 114, which couples to the common system clock 403, may be operable to perform timing operations such as, for example, the PSS synchronization and the SSS detection, based on, for example, a 30.72 MHz clock, provided by the common system clock 403. The mobile device 114 may be operable to receive a signal in a radio frame of 10 ms from the base station 110*a*. The received signal may comprise a PSS and a SSS. The received PSS and SSS may be used by the mobile device 114 to acquire cell-specific parameters via the PSS synchronization and the SSS detection, respectively. The cell-specific parameters may comprise, transmission timing, cell ID, and/or antenna configuration associated with transmissions of the base station 110*a*. The mobile device 114 may be operable to generate sample and/or cycle counts of the common system clock 403 via the timing counter 405 for one or more timed events of the received signal in the radio frame based on corresponding operating bandwidths. As described with respect to FIG. 4 and FIG. 5, the timing counter 405 may be operable to detect the one or more timed events at modulo sample counts of the generated sample and/or cycle counts according to corresponding operating bandwidths.

The radio frame may comprise one or more timed events such as, for example, PSS symbol timing, SSS symbol timing, OFDM symbol timing, sub-frame timing, half-frame timing and/or frame timing of the radio frame. The baseband receiver 400 may be operable to synchronize to the received PSS via the correlation unit 406 and the PSS timing detector 410, respectively. The PSS symbol timing may be determined by the PSS symbol timing detector 410 based on correlation peaks at the output of the correlation unit 406. Once the PSS synchronization is established, the timing counter 405 of the baseband receiver 400 may be operable to count samples of the common system clock 403 in a PSS transmission interval relative to the determined PSS symbol timing. The timing counter 405 may be operable to align the determined PSS symbol timing to the counted samples based on the corresponding sampling frequency, for example, 0.96 MHz.

The sample count may be bit-shifted relative to the aligned PSS symbol timing for the one or more timed events based on corresponding operating bandwidths. For example, for the SSS detection at a sampling frequency of 1.92 MHz, the 5 ms interval sample count (i.e. modulo 153600 counter) may be right bit-shifted by 4 bits. The timing counter 405 may be operable to perform modulo counting on the bit-shifted sample counts based on the corresponding operating bandwidths so as to determine or detect the one or more timed events in the radio frame. The baseband receiver 400 may be operable to perform timing operations at the detected timed events. For example, the processor 412 may be operable to perform SSS processing via the SSS processing unit 412a at the detected SSS symbol timing. The SSS detection unit 412b may be operable to identify the received SSS and corresponding SSS symbol timing. Timed event information derived from the corresponding timing operations, for example, the identified SSS timing via the SSS detection unit 412b, may be communicated to the timing counter 405 to refine the detected one or more timed events in the timing counter 405.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for generating timed events in a radio frame in an E-UTRA/LTE UE receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
  performing by one or more processors and/or circuits in a mobile device, said one or more processors and/or circuits being coupled with a system clock:
    receiving a signal in a radio frame, wherein said received signal comprises a primary synchronization sequence (PSS) and a secondary synchronization sequences (SSS);
    generating sample counts of said system clock for one or more timed events of said received signal in said radio frame based on corresponding operating bandwidths;
    detecting said one or more timed events at modulo sample counts of said generated sample counts based on said corresponding operating bandwidths.

2. The method according to claim 1, wherein said timed events comprise PSS symbol timing, SSS symbol timing, OFDM symbol timing, sub-frame timing, half-frame timing and/or frame timing within said radio frame.

3. The method according to claim 2, comprising synchronizing to said received PSS to determine said PSS symbol timing.

4. The method according to claim 3, comprising counting samples of said system clock relative to said determined PSS symbol timing for said generated sample counts.

5. The method according to claim 4, comprising aligning said determined PSS symbol timing to said counted samples.

6. The method according to claim 5, comprising bit-shifting said counted samples relative to said aligned PSS symbol timing for said one or more timed events based on said corresponding operating bandwidths.

7. The method according to claim 6, comprising performing modulo counting for said one or more timed events based on said corresponding operating bandwidths after said bit-shifting.

8. The method according to claim 7, comprising detecting said one or more timed events based on said modulo counting.

9. The method according to claim 8, comprising performing timing operations at said detected one or more timed events.

10. The method according to claim 9, comprising refining said detected one or more timed events based on said timing operations.

11. A system for communication, the system comprising:
  one or more processors and/or circuits for use in a mobile device, wherein said one or more processors and/or circuits are coupled with a system clock, and said one or more processors and/or circuits are operable to:
    receive a signal in a radio frame, wherein said received signal comprises a primary synchronization sequence (PSS) and a secondary synchronization sequences (SSS);
    generate sample counts of said system clock for one or more timed events of said received signal in said radio frame based on corresponding operating bandwidths; and
    detect said one or more timed events at modulo sample counts of said generated sample counts based on said corresponding operating bandwidths.

12. The system according to claim 11, wherein said timed events comprise PSS symbol timing, SSS symbol timing, OFDM symbol timing, sub-frame timing, half-frame timing and/or frame timing within said radio frame.

13. The system according to claim 12, wherein said one or more processors and/or circuits are operable to synchronize to said received PSS to determine said PSS symbol timing.

14. The system according to claim 13, wherein said one or more processors and/or circuits are operable to count samples of said system clock relative to said determined PSS symbol timing for said generated sample counts.

15. The system according to claim 14, wherein said one or more processors and/or circuits are operable to align said determined PSS symbol timing to said counted samples.

16. The system according to claim 15, wherein said one or more processors and/or circuits are operable to bit-shift said counted samples relative to said aligned PSS symbol timing for said one or more timed events based on said corresponding operating bandwidths.

17. The system according to claim 16, wherein said one or more processors and/or circuits are operable to perform modulo counting for said one or more timed events based on said corresponding operating bandwidths after said bit-shifting.

18. The system according to claim 17, wherein said one or more processors and/or circuits are operable to determine said one or more timed events based on said modulo counting.

19. The system according to claim 18, wherein said one or more processors and/or circuits are operable to perform timing operations at said determined one or more timed events.

20. The system according to claim 19, wherein said one or more processors and/or circuits are operable to refine said determined one or more timed events based on said timing operations.

* * * * *